United States Patent
McBurney et al.

(10) Patent No.: US 6,584,404 B1
(45) Date of Patent: Jun. 24, 2003

(54) THIN-CLIENT

(75) Inventors: Paul W. McBurney, San Francisco, CA (US); Clark W. Rasmussen, San Francisco, CA (US); Frederic Vaucher, San Francisco, CA (US); Kenneth U. Victa, San Francisco, CA (US)

(73) Assignees: Seiko Epson Corporation, Tokyo (JP); eRide, Inc., San Francisco, CA (US)

( * ) Notice: Subject to any disclaimer, the term of this patent is extended or adjusted under 35 U.S.C. 154(b) by 0 days.

(21) Appl. No.: 10/079,249

(22) Filed: Feb. 19, 2002

(51) Int. Cl.[7] .............................................. G01C 21/26

(52) U.S. Cl. ..................... 701/213; 701/33; 701/200; 707/10; 709/224

(58) Field of Search ............................ 701/24, 33, 200, 701/213, 215; 345/738; 707/10; 709/224, 229

(56) References Cited

U.S. PATENT DOCUMENTS

| 6,104,392 A | * | 8/2000 | Shaw et al. ................ 345/749 |
| 6,362,836 B1 | * | 3/2002 | Shaw et al. ................ 345/744 |
| 6,401,085 B1 | * | 6/2002 | Gershman et al. ............ 707/4 |

* cited by examiner

Primary Examiner—Gertrude Arthur

(57) ABSTRACT

A thin-client navigation-satellite receiver network collects GPS pseudorange measurements and communicates them from many independent clients on a computer network to a server. The server computes the respective navigation solutions and sends the results back to each client. A client manager at the server includes a client-request handler that interfaces with the network and collects the discrete requests from each of the clients. An assembler builds complete data sets from one to five seconds worth of data gathered by the client-request handler and spins each ready-to-go job to a bank of navigation servers. A session manager coordinates the inputs-and-results communication on the network and sends its outputs to a client responder.

8 Claims, 1 Drawing Sheet

THIN-CLIENT

FIELD OF THE INVENTION

Figure 1:
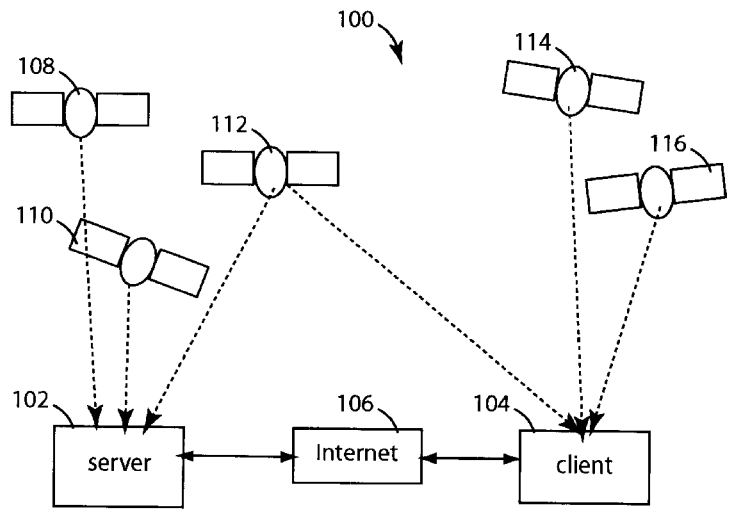

The present invention relates to navigation satellite receivers, and more particularly to methods and systems for off-loading the computational workload of a network client to a network server to compute a navigation fix.

DESCRIPTION OF THE PRIOR ART

The global positioning system (GPS) is a satellite-based radio-navigation system built and operated by the United States Department of Defense at a cost of over $13 billion. Twenty-four satellites circle the earth at an altitude of 20,200 km, and are spaced in orbit such that at any time a minimum of six satellites is in view to any user. Each satellite transmits an accurate time and position signal. A typical GPS receiver measures the time delay for the signal to reach it, and the apparent receiver-satellite distance can then be calculated. Measurements from at least four satellites allow a GPS receiver to calculate its position, velocity, altitude, and time.

A GPS receiver that has just been turned on does not yet know where it is, how much its crystal oscillator is in error, nor what time it is. All these are needed to find and lock onto the satellite transmissions, and so a search must be made of all the possibilities. Each GPS satellite vehicle (SV) transmits navigation (NAV) data that includes ephemeris, clock and almanac information. Such information allows a GPS receiver to compute its position, velocity, and time.

GPS receivers can be interconnected by a computer network to help one another with initialization and on-going navigation solutions.

The current state of development in electronics technology is now allowing excess processor and memory resources in consumer devices to be used in GPS navigation applications. For example, cellular telephones can benefit by being associated with a GPS receiver. But the computational workload and memory demands of a GPS receiver to find a navigation fix can be intense. At a minimum, a GPS receiver needs to collect pseudorange measurements from the GPS satellite vehicles (SV's) it can see. Such observables can then be shipped off elsewhere to compute the navigation solution.

For example, the National Geodetic Survey (NGS) operates the On-line Positioning User Service (OPUS) provides GPS users with access to the National Spatial Reference System (NSRS). OPUS allows users to submit their GPS data files in RINEX format to NGS. The data is processed to find a navigation solution using NGS computers and software. Each RINEX file submitted is processed with respect to three CORS sites. The sites selected may not be the nearest site. They are selected by distance, number of observations, site stability, etc. The position corresponding to the input data is reported back via email. For example, such reports can be formatted in ITRF, NAD83, UTM, or State Plane Coordinates (SPC) northing and easting. OPUS is automatic and requires as input: the email address where the results are to be sent, the RINEX file to process, the antenna type used to collect such RINEX file, the height of the antenna reference point (ARP) above the monument or mark, and the state plane coordinate code for SPC northing and easting. Once this information is completed in a browser window, the user clicks an upload button to send the data to NGS. The results are emailed back a few minutes. The RINEX files can be uploaded one at a time.

SUMMARY OF THE INVENTION

It is therefore an object of the present invention to provide a GPS receiver that connects to a computer network as a client and that off-loads computational loads and memory demands onto a network server.

It is another object of the present invention to provide a method and system for off-loading GPS receivers that share resources with other consumer devices.

Briefly, a thin-client navigation-satellite receiver embodiment of the present invention collects GPS pseudorange measurements and communicates them from many independent clients on a computer network to a server. The server computes the respective navigation solutions and sends the results back to each client. A client manager at the server includes a client-request handler that interfaces with the network and collects the discrete requests from each of the clients. An assembler builds complete data sets from the data gathered by the client-request handler and spins each ready-to-go job to a bank of navigation servers. A session manager coordinates the inputs-and-results communication on the network and sends its outputs to a client responder.

An advantage of the present invention is that a system and method are provided for thin-client navigation satellite receivers.

Another advantage of the present invention is that a system and method are provided for making simple and inexpensive navigation satellite receivers.

These and other objects and advantages of the present invention will no doubt become obvious to those of ordinary skill in the art after having read the following detailed description of the preferred embodiments which are illustrated in the various drawing figures.

IN THE DRAWINGS

Figure 2:
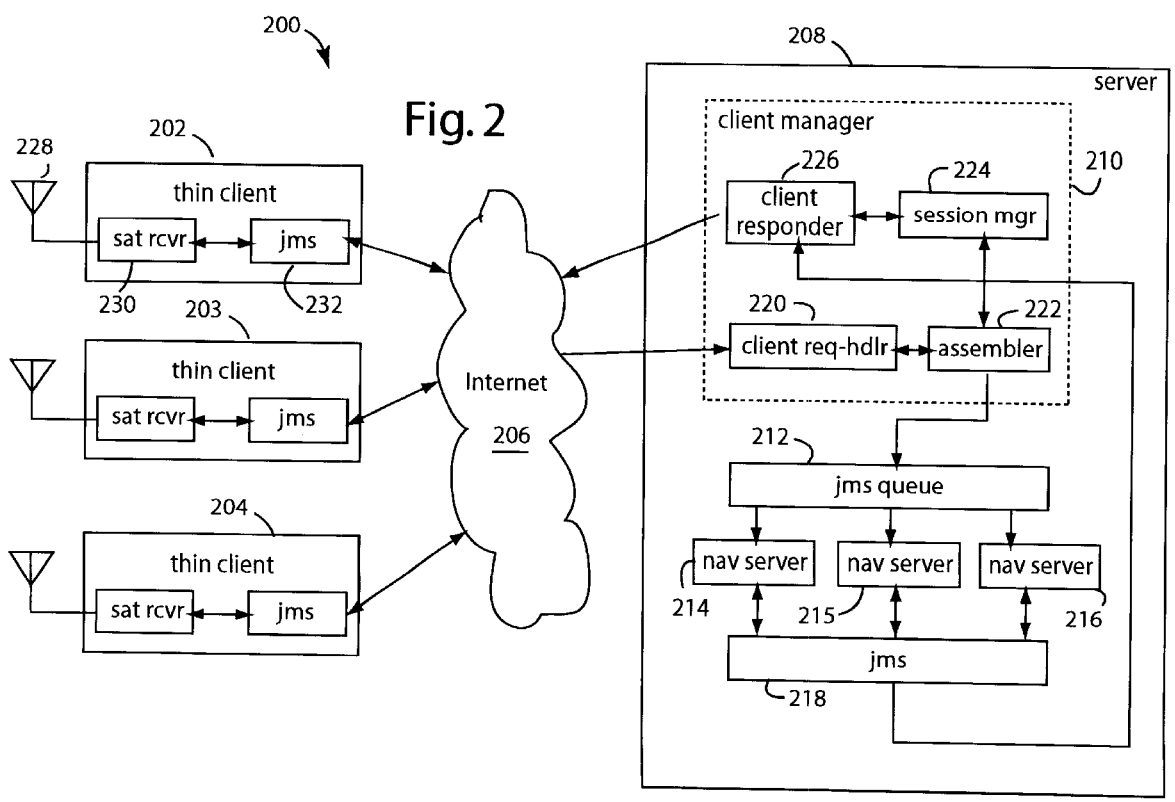

FIG. 1 is a functional block diagram of a network system embodiment of the present invention wherein a server is supporting a client with information communicated over the Internet; and FIG. 2 is a functional block diagram of a thin-client network embodiment of the present invention.

DETAILED DESCRIPTION OF THE PREFERRED EMBODIMENT

FIG. 1 illustrates a network system 100, in an embodiment of the present invention, that includes a reference-station server system 102, a GPS measurement platform 104, and an intervening computer network 106 such as the Internet. The server system 102 includes a navigation satellite receiver that has locked onto and is tracking a constellation of navigation satellite vehicles (SV's) 108, 110, and 112. Some of these may also be visible to the GPS measurement platform 104. Another constellation of navigation satellites, including 114 and 116 is visible to client system 104. The GPS measurement platform 104 includes its own navigation satellite receiver, but such may not have yet locked onto and be tracking its constellation of navigation satellites 112, 114, and 116.

In general, there are three types of GPS measurement platform embodiments of the present invention that are categorized by how independent of the server they can operate. An autonomous client can function and provide navigation solutions to a user with only minimal help from the server 106, e.g., differential correction data. A demi-client needs more help, e.g., polynomial models that simplify ephemeris and time bias calculations. A thin-client lays off just about all the navigation calculations on the server 106, and basically provides only observational measurements from its point of view of the SV constellation. The navigation solutions are returned for local display if a user is there and wants to see them.

Each GPS measurement platform preferably comprises a GPS antenna, a low-noise amplifier (LNA), a GPS surface acoustic wave (SAW) filter, a radio frequency (RF) application specific integrated circuit (ASIC) with an intermediate frequency (IF) SAW-filter, a digital signal processor (DSP), and a reference crystal oscillator. In a thin-client especially, the DSP is a shared part with some other non-GPS application. As such, multi-threaded application programs are not needed at the client and only simple program loops are executed.

High-sensitivity receivers require a great deal of digital data processing and CPU time. It can occur that ordinary signal levels can be processed by a local processor, but high-sensitivity calculations would overload the local processor. In such case, the observational measurements are forwarded to a more capable navigation processor that can specialize in such work and constantly re-use its executable code.

FIG. 2 represents a thin-client navigation satellite receiver network embodiment of the present invention, and is referred to herein by the general reference numeral 200. The network 200 comprises a plurality of thin-client navigation devices, represented by thin clients 202–204, that are connected by the Internet 206 to at least one server 208. In practical implementations, there may be as many as a thousand thin-client navigation devices that send observational measurements over the Internet 206 to a single server 208.

The server 208 includes a client manager 210 that basically organizes all the incoming measurements and information from the thin clients 202–204 into jobs that are ready to begin work. The server 208 further includes several very high speed processors that are shared amongst all the jobs. A queue 212 dispatches these jobs to a next-available navigation server 214–216. In practice, a memory state is saved for every client and such is swapped-in and worked-on by the next-available navigation server 214–216 as new reports are provided through the client manager 210. If any results can be reported, or data requests are issued, a Java messenger service (JMS) 218 collects them, encodes the message, and forwards them back to the thin clients 202–204 via the client manager 210. Other enterprise messaging services besides industry-standard JMS can also be used. JMS allows Java programs to create, send, receive, and read one type of enterprise-messaging-system messages.

When each thin client 202–204 is in its initialization phase, the data collected in the respective queues are preferably processed by a navigation server 214–216 each second. Then once initialization is complete and tracking has commenced, five seconds worth of data is prefably collected before each such navigation processing.

The client manager 210 essentially sends and receives JMS messages to and from all the thin clients 202–204. A client-request handler 220 receives all incoming JMS messages. An assembler 222 organizes these according to client. A session manager 224 provides the basic JMS housekeeping and handshaking needed to effectively package the data and jobs being processed for the Internet communication. A client responder 226 distributes the outgoing JMS messages to the respective thin clients 202–204.

The assembler 222 sifts through the asynchronously received messages from each client and organizes them into buffers, e.g., queues by client-ID. The when a navigation server 214–216 is available to do some work, the whole amount of data in the respective client queues can be processed as far as the data can be taken. The memory states are saved in a scratch memory to be picked up later when the processing can resume again. Given their can be thousands of clients contributing data, the inefficiency in switching the navigation processor between every message is avoided.

Each navigation server 214–216 therefore gets a relatively large amount of data and is able to do more work longer because it does not have to nibble along as each measurement is taken. The navigation servers 214–216 can work more effectively and be shared amongst thousands of clients. Ordinarily, there will be a waiting time between each measurement at a client, and the embodiments of the present invention exploits such wasted time to do useful work with other clients that have supplied complete reports. A complete set of processor memory states is loaded and saved for each client at the beginning and end of each job.

Each thin client 202–204 includes, e.g., an antenna 228, a satellite receiver 230, and a JMS interface 232. The antennas receive signals from the orbiting GPS satellites. These signals are processed by the satellite receiver 230 and converted into observables, e.g., pseudorange measurements.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed is:

1. A thin-client navigation satellite receiver network, comprising:

a plurality of thin-client navigation devices each for collecting measurements from orbiting navigation satellites and each for displaying their respective navigational positions;

a network server for connection to a network and able to communicate with each one of the plurality of thin-client navigation devices, and for providing navigation solutions for each thin-client navigation device from measurements obtained by each;

an assembler associated with the network server and providing for a gathering of said measurements into complete jobs for processing;

at least one navigation server located at the network server and providing for navigation computations from each of said complete jobs for processing forwarded by the assembler; and a session manager and client responder for providing said respective navigational positions to each of the plurality of thin-client navigation devices.

2. The network of claim 1, wherein:

the plurality of thin-client navigation devices each comprise a navigation platform that periodically sends JMS messages related to GPS satellite observational measurements to the network server.

3. The network of claim 1, wherein:

the plurality of thin-client navigation devices comprises thousands of navigation platform that all asynchronously and periodically send JMS messages related to their respective GPS-satellite observational measurements to the network server.

4. The network of claim 1, wherein:

the assembler provides for collection of JMS messages related to GPS-satellite observational measurements from the plurality of thin-client navigation devices and sorts them by client-ID into navigation processing buffer queues.

5. The network of claim 1, wherein:

the assembler sifts through asynchronously received messages from each client and organizes them into queues by client-ID such that when a navigation server is available to do some work, the whole amount of data in a respective client queue can be processed as far as the data can be taken, and wherein the memory states are saved in a scratch memory to be picked up later when processing can resume again, and wherein an inefficiency in switching the navigation processors between every JMS message is avoided.

6. A method for computing thousands of navigational solutions for widely distributed users, the method comprising the steps of:

obtaining a plurality of observational measurements with independent navigation platforms all connected to a single data network;

enterprise messaging such observational measurements from a plurality of network clients to a network server;

assembling respective ones of said observational measurements in a buffer according to corresponding ones of said network clients;

processing a run of data for a single one of said network clients by loading and saving processor memory states for each run; and outputting navigation solutions back to said network clients that are derived from corresponding sets of said plurality of observational measurements.

7. The method of claim 6, wherein:

the step of processing a run of data occurs about once a second during initialization of a respective one of said independent navigation platforms.

8. The method of claim 6, wherein:

the step of processing a run of data occurs about every five seconds after an initialization of a respective one of said independent navigation platforms.

* * * * *